United States Patent [19]
Greenwood et al.

[11] Patent Number: 6,034,688
[45] Date of Patent: Mar. 7, 2000

[54] SCROLLING NAVIGATIONAL DISPLAY SYSTEM

[75] Inventors: Wayne Eugene Greenwood, Palo Alto; Alan Martin Cooper, Menlo Park; Karen Louise Evensen, Lake Forest, all of Calif.

[73] Assignees: Sony Corporation, Tokyo, Japan; Sony Trans Com Inc., Irvine, Calif.

[21] Appl. No.: 08/929,742

[22] Filed: Sep. 15, 1997

[51] Int. Cl.[7] .................................................. G06F 3/14
[52] U.S. Cl. ............................... 345/353; 345/346
[58] Field of Search .................................. 345/352, 351, 345/340–350, 326, 327–339, 136, 353–357; 348/94

[56] References Cited

U.S. PATENT DOCUMENTS

| | | | |
|---|---|---|---|
| 4,584,603 | 4/1986 | Harrison | 358/86 |
| 4,756,528 | 7/1988 | Umashankar | 273/1 E |
| 5,311,302 | 5/1994 | Berry et al. | 398/19 |
| 5,347,632 | 9/1994 | Filepp et al. | 395/200 |
| 5,442,390 | 8/1995 | Hooper et al. | 348/7 |
| 5,529,265 | 6/1996 | Sakurai | 244/118.5 |
| 5,666,499 | 9/1997 | Baudel et al. | 345/347 |
| 5,708,787 | 1/1998 | Nakano et al. | 395/352 |
| 5,781,193 | 7/1998 | Alimpich et al. | 345/352 |
| 5,786,819 | 11/1998 | Weiser et al. | 345/354 |
| 5,821,935 | 10/1998 | Hartman et al. | 345/349 |
| 5,821,936 | 10/1998 | Shaffer et al. | 345/352 |
| 5,825,353 | 10/1998 | Will | 345/184 |
| 5,828,376 | 10/1998 | Solimere et al. | 345/352 |
| 5,832,471 | 11/1998 | Fukui | 707/1 |

*Primary Examiner*—Steven P. Sax
*Attorney, Agent, or Firm*—Blakely, Sokoloff, Taylor & Zafman LLP

[57] ABSTRACT

A user-interface system adapted to navigate through a plurality of menus is disclosed. The system comprises a display system comprising a display having a category area on a first portion of the display, the category area displaying a plurality of categories, including a currently displayed category. Each of the plurality of categories has a plurality of items. The display also has a marquee area on a second portion of the display, which displays items of the currently displayed category. The system further comprises a scrolling mechanism for scrolling through items of each category of the plurality of categories. The marquee area is updated by the scrolling mechanism to display the corresponding items in each category. The scrolling mechanism also indicates a position of a currently displayed item of a currently displayed category by updating the category area. Various embodiments are disclosed.

26 Claims, 8 Drawing Sheets

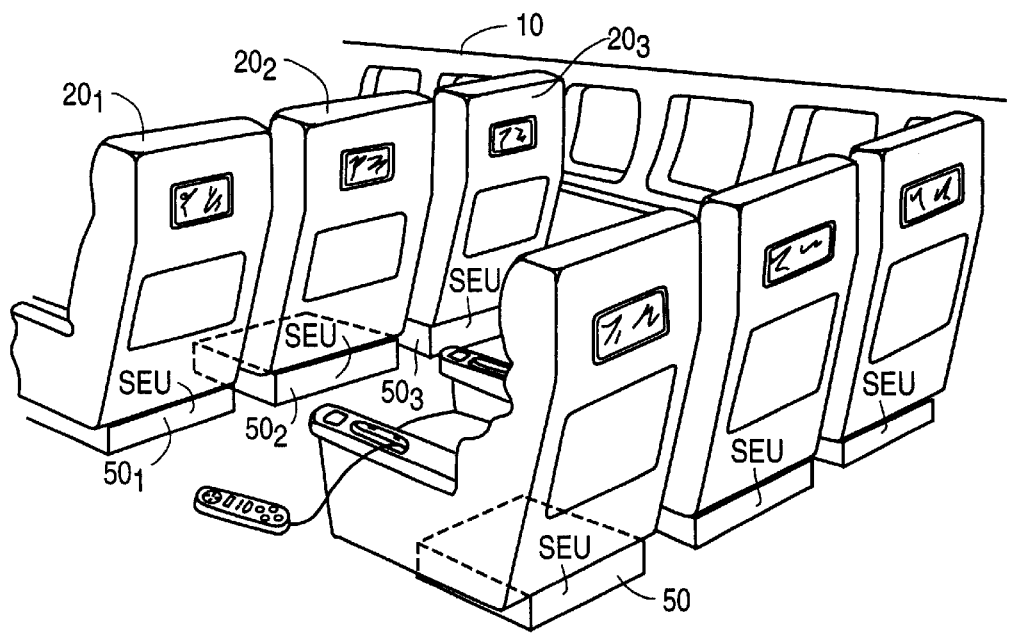
FIG_2A
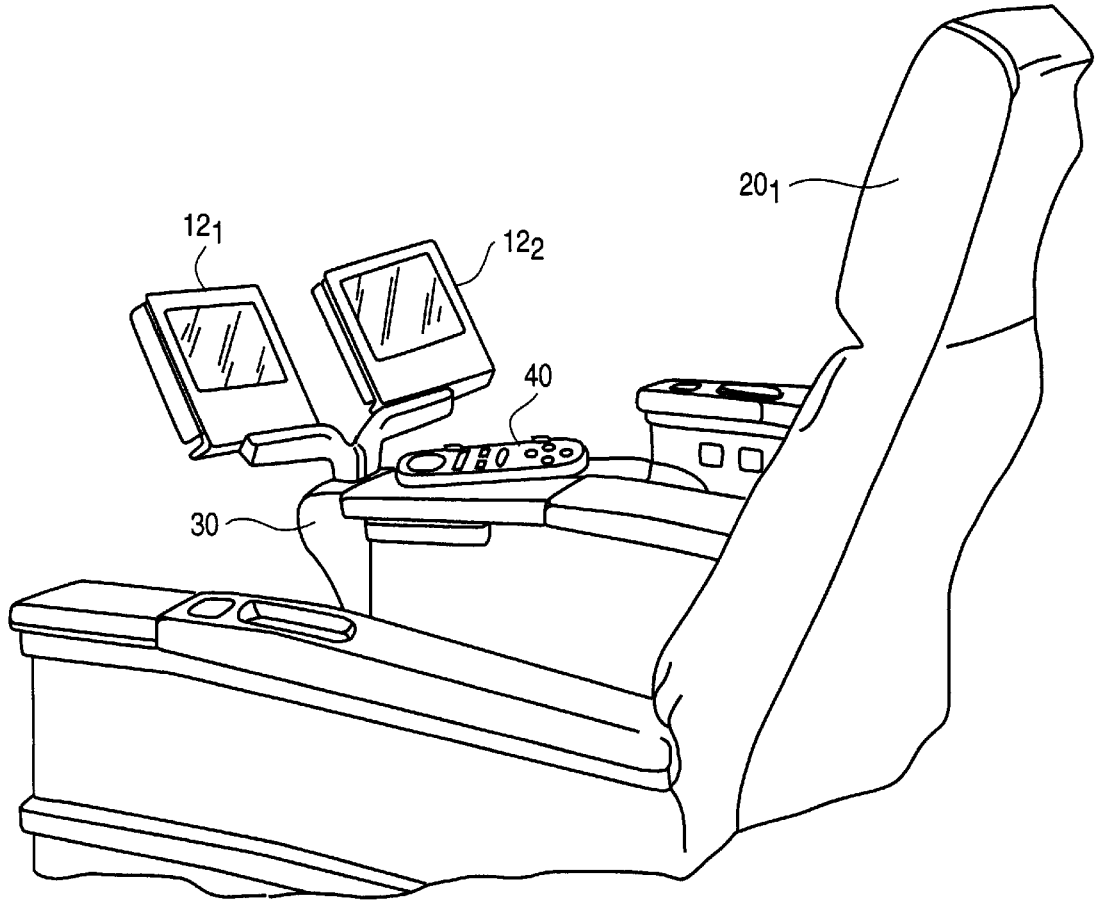
FIG_2B

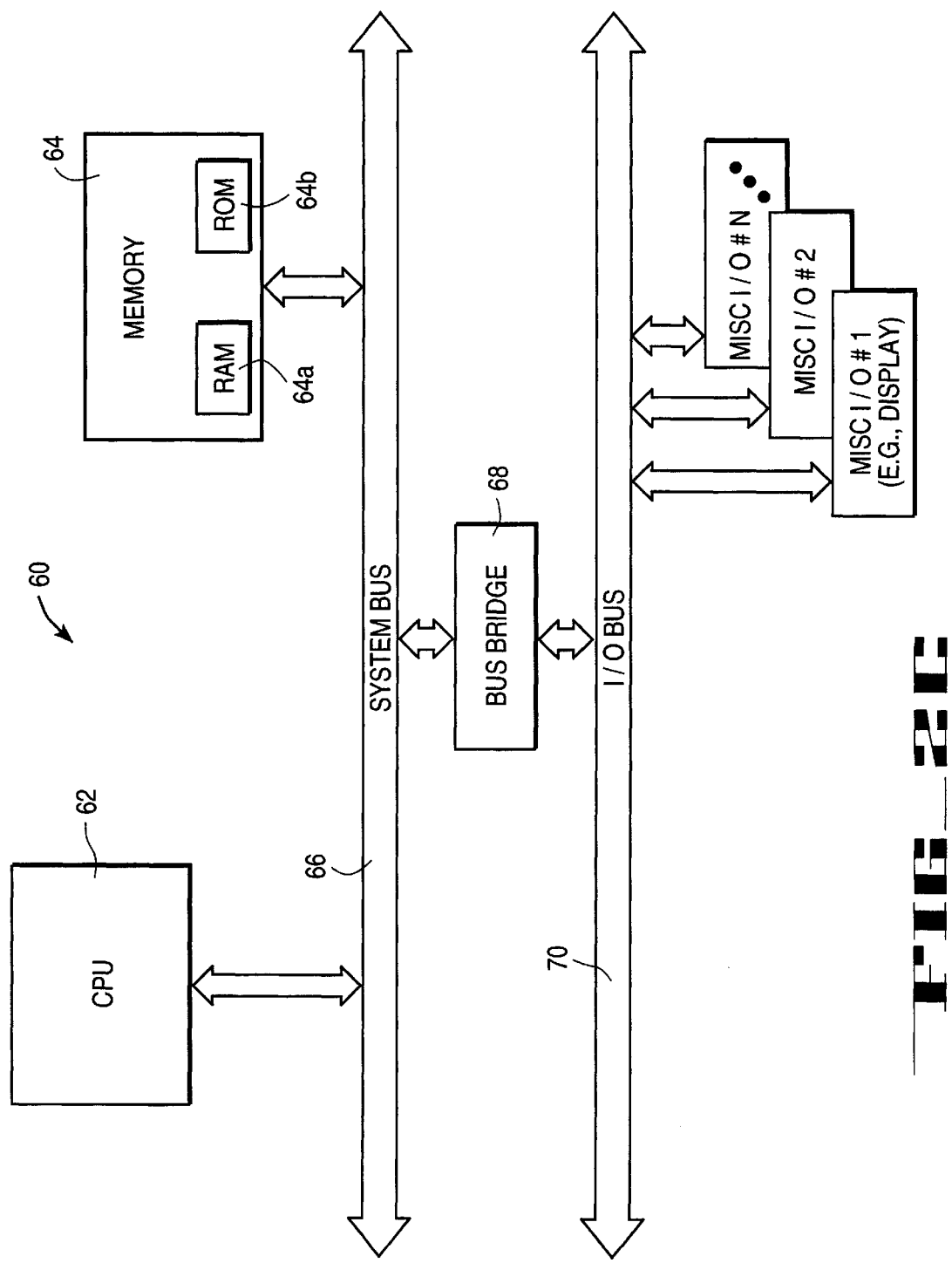
FIG._2C

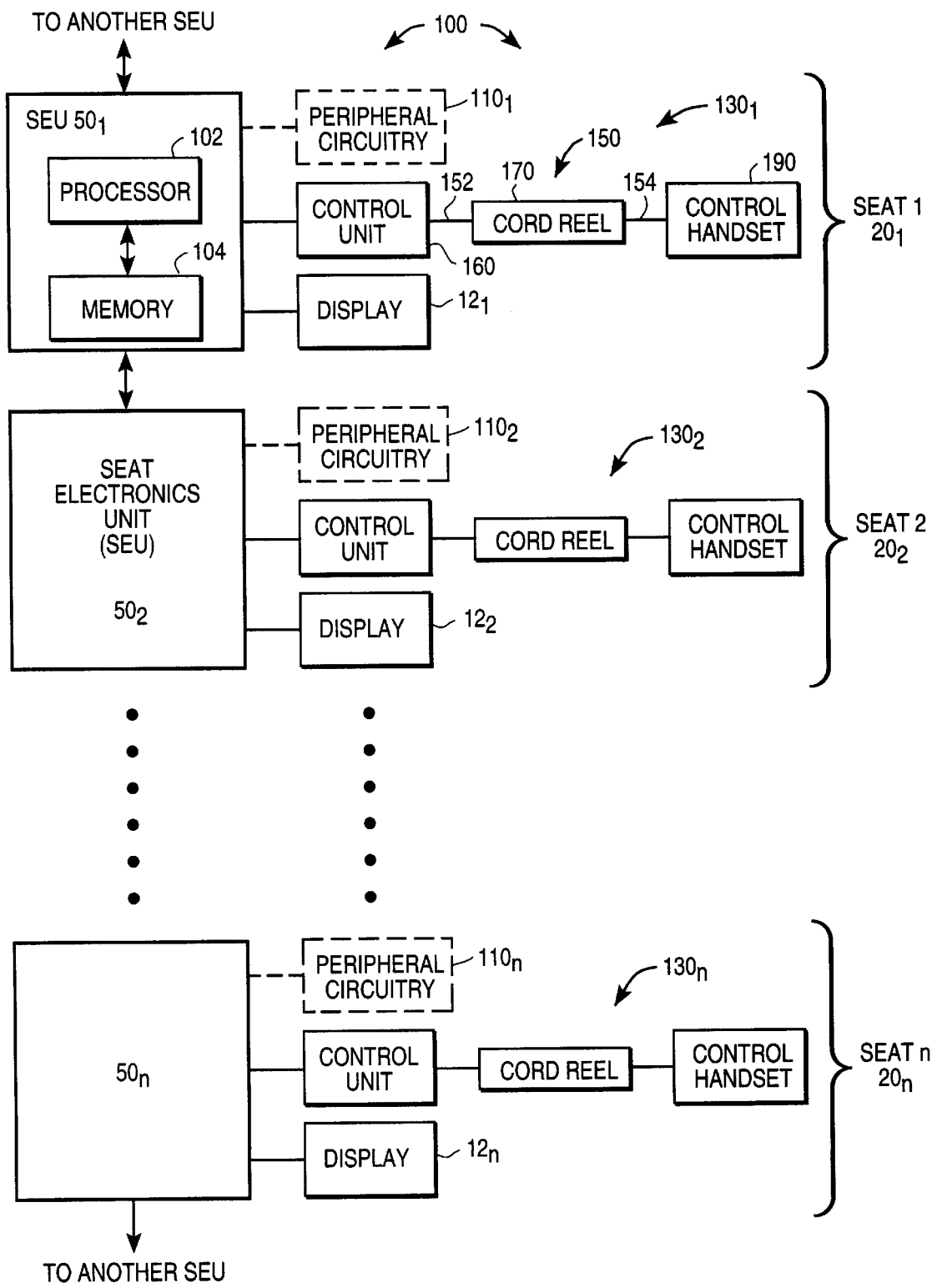
FIG_3

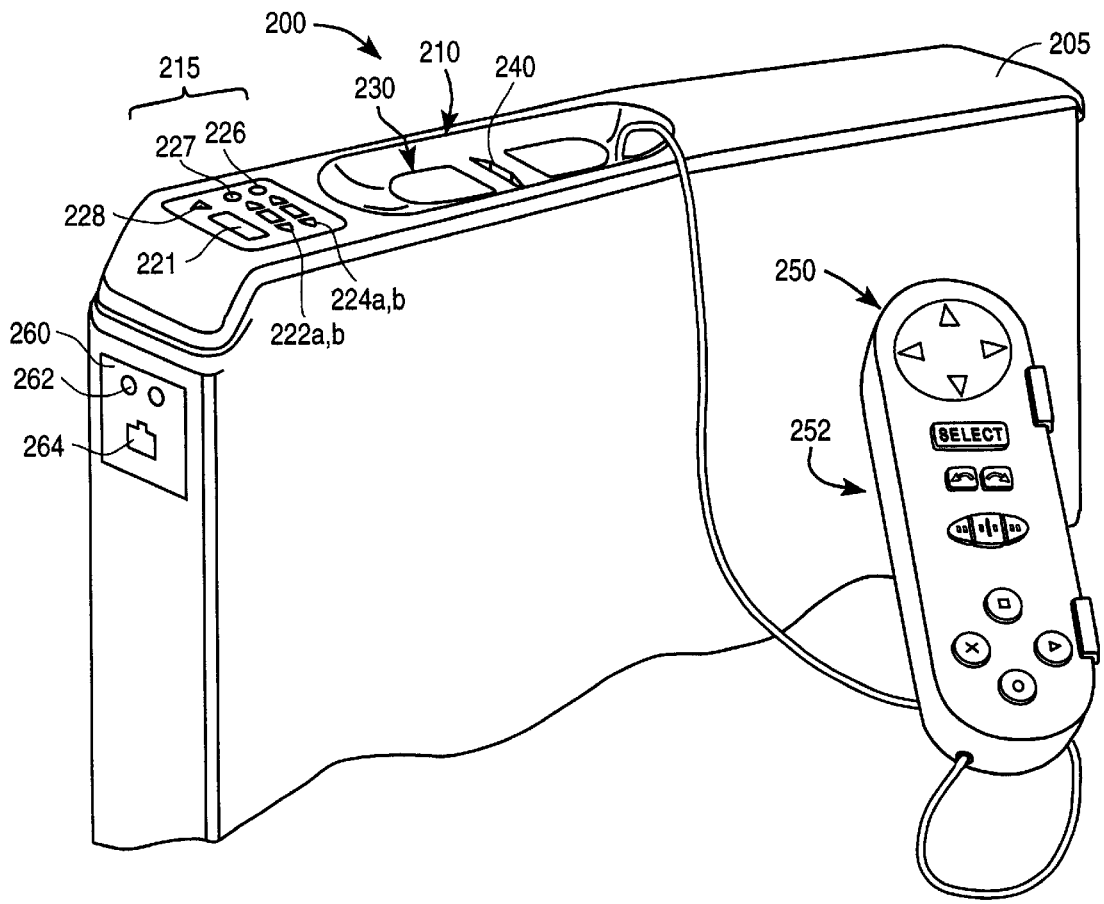
FIG_4
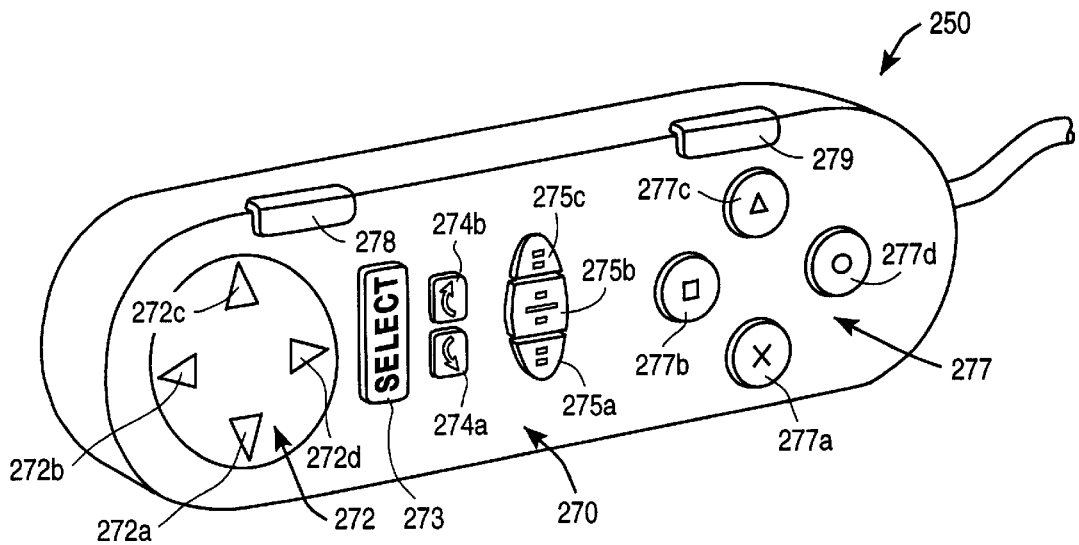
FIG_5

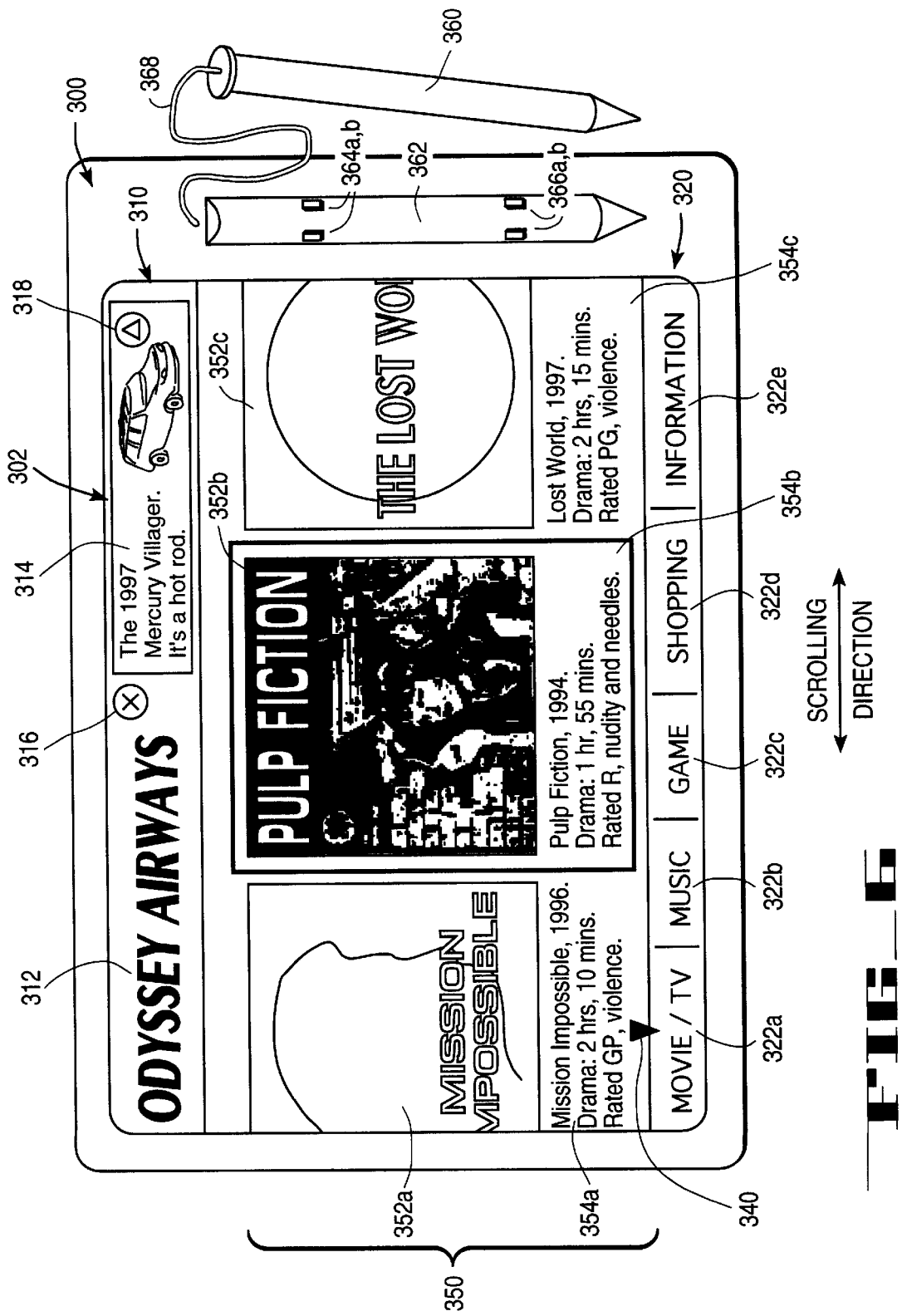
FIG_6

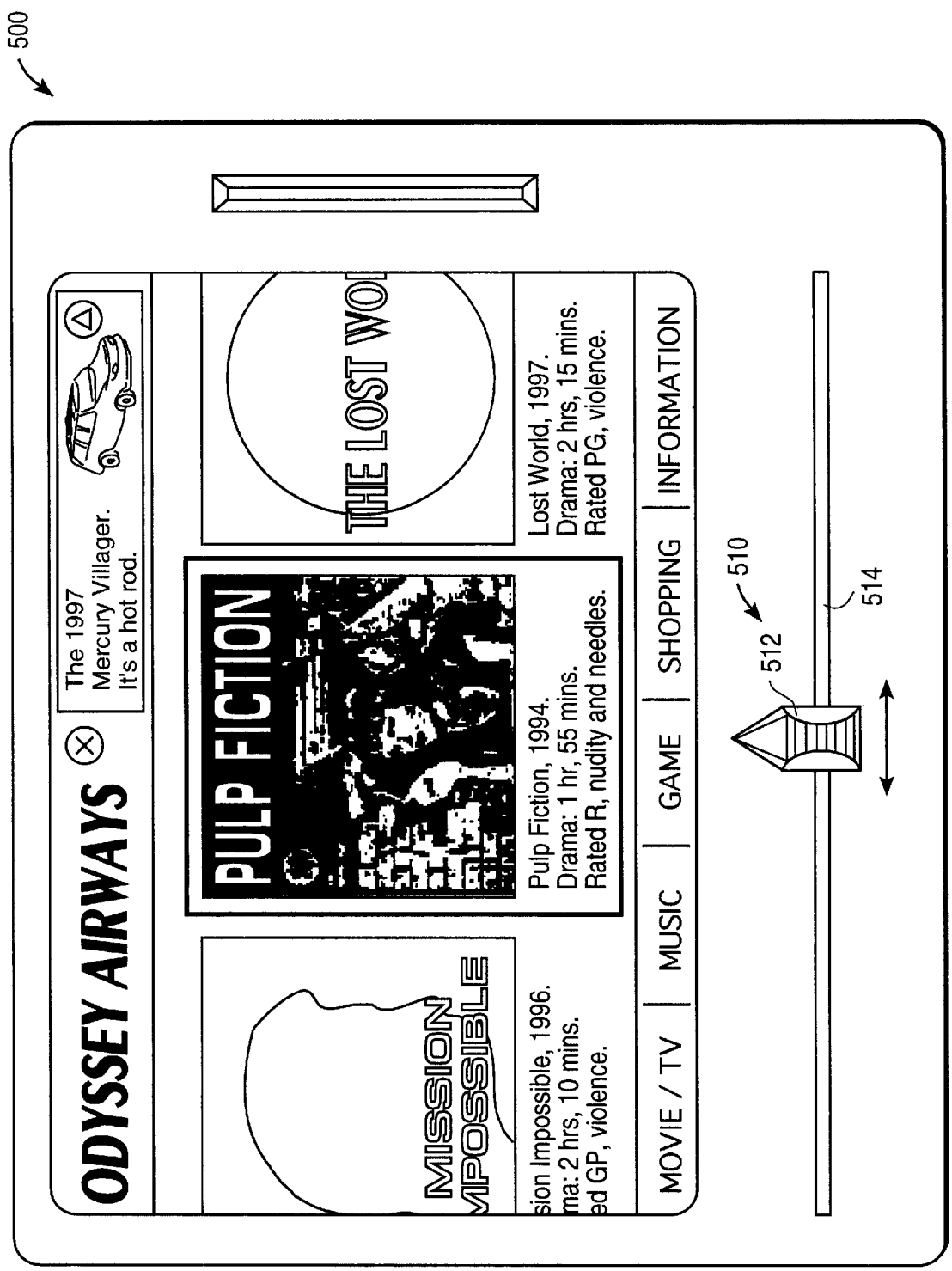

SCROLLING NAVIGATIONAL DISPLAY SYSTEM

BACKGROUND OF THE INVENTION

1. Field of the Invention

The present invention relates to the field of communications. More particularly, the present invention relates to an integrated electronic system, typically situated in commercial aircraft, that supports interactive entertainment and other amenities available to its passengers, which features a method and apparatus of providing a scrolling navigational display system for reviewing and selecting audio or video information and/or activities, such as surveys, entertainment activities and travel schedules.

2. Description of the Related Art

Over the past few decades, commercial aircraft has become a necessary mode of travel for personal and business reasons. To improve passenger comfort, commercial aircraft typically offer a number of entertainment activities that can be enjoyed by the passenger, such as video games, movies and various selections of music. In addition, various electronic systems for supporting communications and/or other in-flight functions are provided.

Such electronic systems typically comprise seat electronic units which receive the in-flight entertainment programs or activities. The in-flight entertainment programs are typically delivered from a central system to a display that is installed onto the back of each of the passenger seats. Alternatively, the display may be mounted to an armrest of the passenger seat. The display is typically controlled by a hand-held control unit. Both the display and the hand-held control unit are directly coupled to a seat electronics unit (SEU) which receives control signals from the hand-held control unit to select a menu representing one of a number of interactive entertainment activities. The hand-held control unit, combined with the display screen, allows the user to navigate a series of hierarchical menus.

As shown in FIGS. 1A and 1B, the main screen 2 on the display 4 generally provides 5 to 6 categories of activities from which to select. If a large number of entries exist in each of the categories, the user has to scroll through additional items that are displayed on a second or third display page (such as that shown in FIG. 1C) to view the entries. Such a display system is typically difficult and confusing to use, especially for non-English speaking users who have low comfort with electronic systems and/or high technology or unsophisticated users.

One approach to the above display systems include the incorporation of a touch screen into the display 4. These systems continue to present the same hierarchical menus that are used with the aforementioned display systems. The result is frequent tapping by the user to make their selection on each of the series of menus.

Accordingly, there is a need in the technology for an apparatus and method for providing an extremely simple, user-friendly and intuitive user interface for a display system which overcomes the above-described disadvantages.

BRIEF SUMMARY OF THE INVENTION

A user-interface system adapted to navigate through a plurality of menus is disclosed. The system comprises a display system comprising a display having a category area on a first portion of the display, the category area displaying a plurality of categories, including a currently displayed category. Each of the plurality of categories has a plurality of items. The display also has a marquee area on a second portion of the display, which displays the plurality of items of a currently displayed category. The system further comprises a scrolling mechanism for scrolling through items of each category of the plurality of categories. The marquee area is updated by the scrolling mechanism to display the corresponding items in each category. The scrolling mechanism also indicates a position of a currently displayed item of a currently displayed category by updating the category area. Various embodiments are disclosed.

BRIEF DESCRIPTION OF THE DRAWINGS

FIG. 2A is a perspective view of one embodiment of a display system 10 which implements the scrolling navigational display system of the present invention.

FIG. 2B is a perspective view of a second embodiment of a display system 10' which implements the scrolling navigational display system of the present invention.

FIG. 2C illustrates one embodiment of a processor system 60 which implements the scrolling navigational display system of the present invention.

FIG. 3 illustrates a simplified block diagram of an electronic system 100 associated with the display navigational system 10 of FIG. 2A or the display navigational system 10' of FIG. 2B.

FIG. 4 is a perspective view of one embodiment of the integrated electronic system 200 which is installed within an armrest 205 of a commercial aircraft.

FIG. 5 is a perspective view of the control handset 250 of FIG. 4.

FIG. 6 illustrates one embodiment of a display screen 300, which implements the scrolling navigational display system in accordance with the teachings of the present invention.

FIG. 8 illustrates a further alternate embodiment of a display screen 500, which implements the scrolling navigational display system in accordance with the teachings of the present invention.

DETAILED DESCRIPTION OF THE INVENTION

Figure 1A:
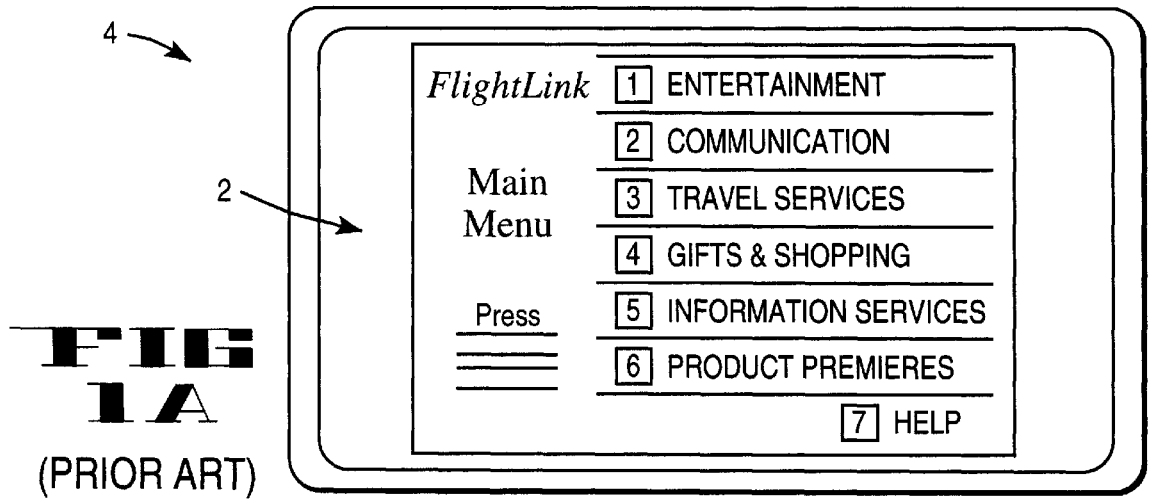
FIGS. 1A–1C illustrate conventional navigational display systems.
Figure 1B:
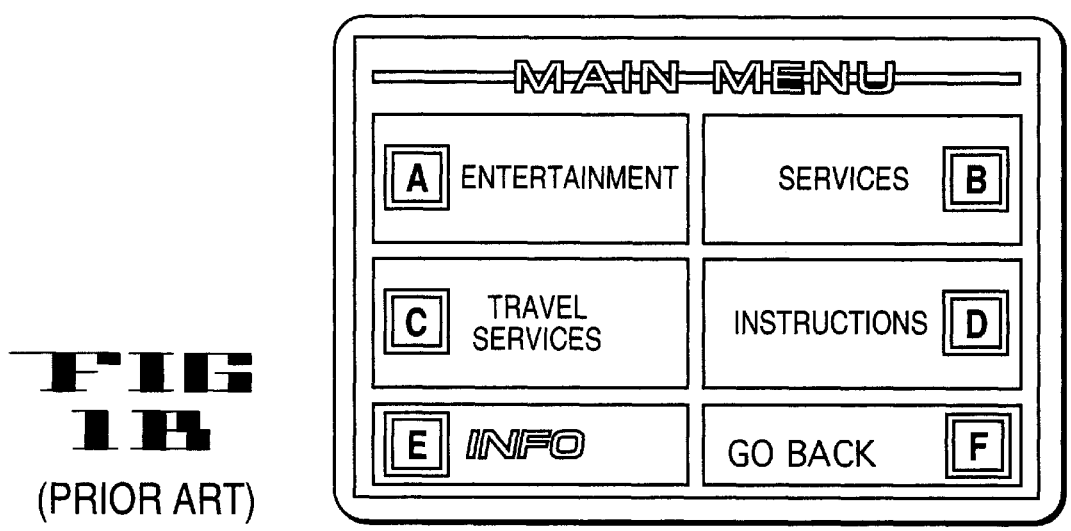
Figure 1C:
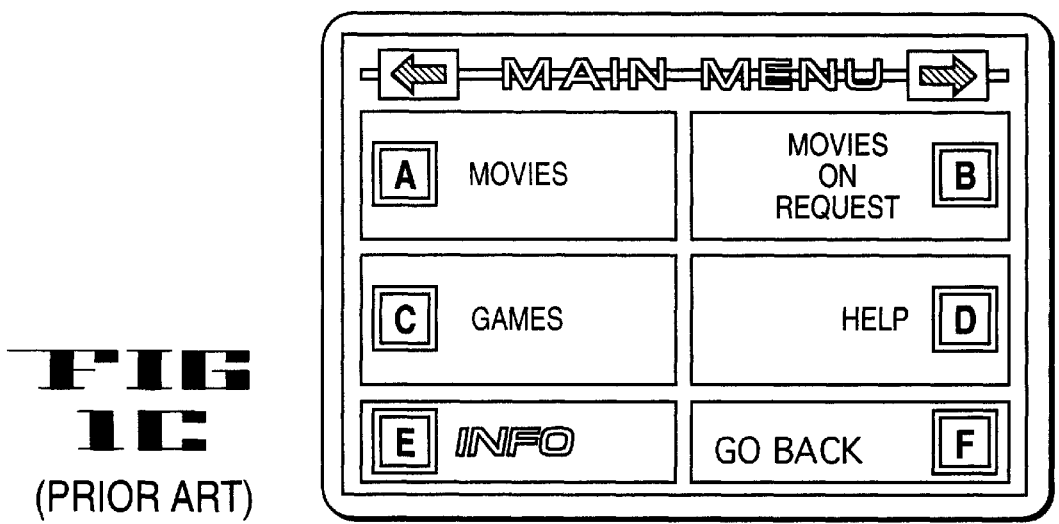

The present invention relates to a scrolling navigational display system for viewing and selecting entertainment activities and/or information. The scrolling navigational display system may be controlled by a control handset that operates as both a telephone and a control unit for the display or a data wheel that is coupled to the display screen. The control handset or the data wheel are coupled to a processor in order to control requisite entertainment activities and/or information, and to assist in transferring data between the control handset or the data wheel and the processor. The scrolling navigational display system facilitates viewing of a plurality of categories of information and/or entertainment activities, each having a plurality of items or selections. Each category of items may be scrolled across the screen, one category after another, for viewing, in a seamless manner. In one embodiment, the viewer may skip from category to category, and then view the items in the desired category by scrolling the items across the display screen.

Herein, a number of illustrative embodiments are described in order to convey the spirit and scope of the present invention. In addition, numerous specific details are set forth, such as exemplary types of serial data lines, which are useful but not required to practice the present invention.

As shown in FIG. 2A, the navigational display system 10 of the present invention comprises a display 12 that is installed onto the back of each of the passenger seats $20_1$, $20_2$ and $20_3$. In-flight entertainment programs are typically delivered from a central system to the display 12. Alternatively, as shown in FIG. 2B, the display e.g., $12_1'$ or $12_2'$ may be mounted to an armrest 30 of the passenger seat 20'. The display 12 is typically controlled by a hand-held control unit 40. Both the display 12 and the hand-held control unit 40 are directly coupled to a seat electronics unit (SEU) 50 which receives control signals from the hand-held control unit 40, so to select a menu representing one of a number of categories of interactive entertainment activities and/or information. The hand-held control unit 40, combined with the display screen 12, allows the user to easily navigate through a series of menus that may be scrolled across the display screen, as discussed in detail in the following sections.

FIG. 2C illustrates a further alternate embodiment of the navigational display system 10 of the present invention. As shown in FIG. 2C, the navigational display system 10 may be installed within a processor system 60 such as a computer system which implements a display. The processor system 60 comprises a CPU 62 and a memory module 64. The memory module 64 includes random access memory (RAM) 64a and read-only memory (ROM) 64b. In one embodiment, the memory module 64 also includes a main memory or a dynamic random access memory (DRAM). The CPU 62 and memory module 64 are coupled to a system bus 66.

The processor system 60 may also include various I/O and peripheral modules (MISC I/O #1, #2, . . . #N) which are coupled along an I/O bus 70 that is in turn coupled to the system bus 66 via a bus bridge. Examples of the peripheral modules include a display, a console, a printer and a mouse. The scrolling navigational display system 10 may also be implemented within a shopping mall kiosk system, in which a list of the vendors within the mall, along with a list of the available goods or services, may be displayed. It is thus apparent to one of ordinary skill in the technology that the navigational display system 10 of the present invention may be implemented within any display system in which a display of a number of categories of activities, items and/or information is presented on a display screen.

In another alternate embodiment of the navigational display system 10 of the present invention, a dedicated screen processor (not shown), such as a processor that is mounted on the back of a display e.g., display 12, may be implemented. The dedicated screen processor may be configured to operate directly through commands issued via a hand-held control unit such as the control unit 40. Alternatively, the user may enter commands or selections through a data wheel (see FIG. 7 and accompanying text) or a slider (see FIG. 8 and accompanying text) that is configured to operate directly with the dedicated screen processor, or with any one of the above-described processors.

FIG. 3 illustrates a simplified block diagram of the electronic system 100 associated with the display navigational system 10 of FIG. 2A or the display navigational system 10' of FIG. 2B. The electronic system 100 is associated with a group of n passenger seat(s) $20_1$–$20_n$ ( where n is an integer) on a commercial aircraft. The electronic system 100 includes a plurality of multiple seat electronic units ("SEUs") $50_1$–$50_n$ coupled together in series. Each SEU $50_1$–$50_n$ comprises a processor 102 that is coupled to memory 104. In one embodiment, the available activities and/or information are stored in memory 104. The processor executes a plurality of instruction sequences stored in memory 104, so as to provide the user with the selected activity and/or information. In an alternate embodiment, the processor 102 provides the selected activity and/or information in accordance with instruction sequences stored in memory 104, so as to retrieve the selected activity and/or information that are stored in a central location (not shown). Upon retrieval of the selected activities and/or information, the processor 102 stores the activity and/or information in memory 104, prior to display of the selected activity and/or information.

Each SEU $50_1$–$50_n$ is coupled to a display $12_1$–$12_n$ (e.g., a flat panel display including a liquid crystal display), an integrated electronic system $130_1$–$130_n$ and possibly peripheral circuitry $110_1$–$110_n$ supporting a modem connector (e.g., RJ-11 connector) or a head phone connector, if one or both of these connectors are not supported by an integrated electronic system (e.g. any one of $130_1$–$130_n$). Each passenger seat $20_1$–$20_n$ is uniquely assigned to a corresponding display $12_1$–$12_n$, an integrated electronic system $130_1$–$130_n$ and peripheral circuitry $110_1$–$110_n$. Based on input signals from the integrated electronic systems $130_1$–$130_n$ or the peripheral circuitry $110_1$–$110_n$ (if implemented), the SEU 50 performs operations on the input and responds appropriately (e.g., sends signals to on-board telephony circuitry to make a call, alter images displayed or a menu selection on the display and the like). The SEU 50 is usually mounted under one of the group of passenger seats $20_1$, . . . , or $20_n$, as shown in FIG. 2A. For present discussion purposes, each passenger seat $20_1$–$20_n$ will be refereed to as passenger seat 20; each display $12_1$–$12_n$ will be referred to as display 12; each SEU $50_1$–$50_n$ will be referred to as SEU 50; and each integrated electronic system $130_1$–$130_n$ will be referred to as an integrated electronic system 130.

Each integrated electronic system 130 includes at least one control unit 160 coupled to the SEU 50 through a communication path 150. In one embodiment, the control unit 160 is coupled to a control handset 190 through another communication path 152. As shown in FIG. 3, the communication path 152 features a cable having a plurality of signal lines coupled to the control unit 160 preferably through a cord reel 170. The cord reel 170 is adapted to maintain the cable coupled to the control handset 190 generally taut so that it recoils when the control handset 190 is returned to its stored condition.

The peripheral circuitry $140_1$–$140_n$ may include two connectors; namely, a head phone connector 262 and a modem connector 264, as shown in FIG. 4. The head phone connector 262 provides the passenger audio upon inserting a connector of a headset therein. Similarly, the modem connector 264 allows the passenger to exchange information between a remotely located source and his or her computer. It is contemplated, however, that one or both of these connectors may be implemented on the arm rest 205 of the passenger seat as shown in FIG. 4.

FIG. 4 illustrates a perspective view of one embodiment of the integrated electronic system 200 which is installed within an armrest 205 of a commercial aircraft. The integrated electronic system 200 includes an island unit 210 featuring the control unit 220 (shown in FIG. 3 as control unit 160) and a compartment 230 sufficiently sized to store the control handset 250 (shown in FIG. 3 as control handset 190). A locking mechanism 240 is placed proximate to the periphery of the compartment 230 to become engaged with a first edge 252 of the control handset 250 in order to maintain the control handset 250 within the compartment 230 during non-use. The control handset 250 is released from the compartment 230 by firmly depressing the locking mechanism 240.

As shown, the integrated electronic system 200 further includes control unit 215 which comprises a light emitting diode ("LED") display 221, a pair of audio channel control buttons 222a–b, a pair of audio volume control buttons 224a–b, a light switch 226, an attendant call button 227 and an attendant call reset button 228, all of which are supported by a circuit board or flex circuitry encased with the armrest 205. Alternatively, the circuit board may be encased within the control handset 220. The LED display 221 illustrates the in-flight audio channel currently selected by the passenger such as, for example, a channel featuring rock 'n roll music, audio for video movies or other types of audio. The pair of audio control buttons 222–223 controls the selection of the in-flight audio channel and the volume of the audio, respectively. The light switch button 226 is a switch for the reading light assigned to the passenger seat. Likewise, the attendant call button 227 is a call button for a flight attendant while the attendant call reset button 228 is a call button reset.

A connector unit 260 is installed on a side of the armrest 205, as shown in FIG. 4. The connector unit 260 comprises a headphone connector 262 and a modem connector 264. The dual-input headphone connector 262 is a female type connector into which a passenger is to insert a male connector of a headset (not shown) in order to listen to the audio. The modem connector 264 provides a communication path for the passenger to send information from his or her computer to a remotely located destination and to receive information from a remotely located source. The connector unit 260 is also supported by the circuit board or flex circuitry encased within the armrest.

Referring to FIGS. 4 and 5, the features for the display control unit are placed on a display side 270 of the control handset 250. These features include a direction controller 272 (which includes 4 direction indicia or arrows 272a–d), a "select" button 273, a pair of "skip" buttons 274a and b, three video control buttons 275a–c, an ABXY button grid 277 (which includes buttons 277a–d) and a pair of trigger or hot keys 278–279. The trigger or hot keys 278–279 may also be referred to as "fire" buttons. The direction controller 272, select and pause buttons 273–274, the ABXY button grid 277 and the pair of hot keys 278–279 are video game controls used by many commercially available video systems such as those made and manufactured by Nintendo of Japan. The "skip" buttons 274a–b are used for skipping from one category (for example, for skipping from category 322a to 322b, as shown in FIG. 6) to the next. The three video control buttons 275a–c include a fast reverse button 275a, a play/stop button 275b and a fast forward button 275c. One example of the control handset 220 is that disclosed in U.S. patent application Ser. No. 08/639,287, entitled "Integrated Electronic System Utilizing a Universal Interface to Support Telephone and Other Communication Services", which is assigned to the assignee of the present invention.

The scrolling navigational apparatus and method provided in accordance with the principles of the present invention, will now be described. FIG. 6 illustrates one embodiment of a display screen 300 of one of the displays $120_1$–$120_n$. In one embodiment, the display screen 300 is 8.6 inches by 6 inches. In an alternate embodiment, the display screen 300 is 6.4 inches by 4 inches. Examples of the display screen 300 include the seat video displays as marketed by Sony TransCom, Inc. of Irvine, Calif., under the part designation 970-004-001 or 970-0015-00X (where X is an integer and X≧1). The display screen 300 displays a display page 302 which includes a banner or header 310 for displaying passenger information or advertisement. In one embodiment, the banner or header 310 includes a label section 312, which displays the name of the airlines providing the in-flight entertainment, and an advertisement section 314. Upon selection of the displayed button, for example, 316 or 318 (corresponding to an ABXY button 277a or 277c (see FIG. 5), respectively), associated with the label section 312 or the advertisement section 314, respectively, the corresponding information will be retrieved and displayed on the display screen 300.

The display screen 300 also comprises a category bar or footer 320 which displays a plurality of in-flight activities or program categories (generally referred to herein as "categories") such as movies, music, games, shopping and information. In one embodiment, the footer 320 is divided into a plurality of categories or sections 322a, 322b, . . . , 322n, each of which displays the title of the activity or program available. In the embodiment of FIG. 6, the sections include Movie/TV 322a, Music 322b, Games 322c, Shopping 322d and Information 322e. It is apparent to one of ordinary skill that the sections may include any category of items as desired. Such categories may include surveys, entertainment activities and travel schedules. The footer 320 further comprises a position indicator 340, which is located above the currently selected or displayed category. It is also contemplated that the categories or sections 322a, 322b, . . . , 322n that are scrollable, may be provided. For example, in the embodiment of FIG. 6, additional categories, such as surveys, schedules or travel tips, may be provided in addition to the five categories 322a–322e shown. In this case, upon reaching the end of the information category 322e, the user may continue to scroll towards the right, to view the additional categories. Similarly, the user may scroll towards the left to view previous or additional categories.

The display screen 300 also comprises a marquee section 350 which includes a plurality of marquee selection boxes 352a, 352b, . . . , 352n, each of which illustrates a graphical display of the selections available. The marquee section 350 also includes a plurality of content information sections 354a, 354b, . . . , 354n, each of which is located below and corresponds to the plurality of marquee selection boxes 352a, 352b, . . . , 352n. Each of the plurality of content category sections 354a, 354b, . . . , 354c provides text describing the marquee selection illustrated.

In particular, to provide the user with the name of the currently displayed category and the relative position of the currently displayed item within that category, the section 322a, 322b . . . , 322n of the category bar or footer 320 representative of the program category that is currently being displayed, is highlighted. In addition, the position indicator 340 is placed at a location above the section 322a, 322b . . . , or 322n representative of the currently displayed program category. As a result, the location of the position indicator 340 indicates currently displayed category, as well as the position of the currently displayed selection or items with respect to the available selections or items in the currently displayed category.

For example, when viewing the Movie/TV category, the section 322a is highlighted, and the items or selections may be scrolled across the display screen 300. The position indicator 340 will be located above the section 322a, and its position above the section 322a indicates the relative position of the displayed items, such as 352a, 352b and 352c, with respect to the items available in the entire Movie/TV category as shown in section 322a. Assuming that the user continues to stroll towards the right of the display page 302, the end of the items available in the Movie/TV category in section 322a will be encountered. At that juncture, the position indicator 340 will move over to the Music category as shown in section 322b, and the section 322b will light up, while the Movie/TV category in section 322a will cease to be highlighted.

In one embodiment, the user may utilize indicia or arrows 272a–d in the direction controller 272 (see FIG. 5) to select from among the items shown in the marquee section 350. For example, the user may use either the buttons 272a and 272c (when holding the control handset in a vertical position) or the buttons 272b and 272d (when holding the control handset in a horizontal position) to navigate or view the available items (e.g., any one of 352a, 352b, or 352c) from among the marquee selection boxes (352a–352c) listed. The available items or selections may be scrolled across the display screen 300 by using the direction button 272. In one embodiment, the available selections may be scrolled from left to right or vice versa, across the display screen 300. An example of such an embodiment is shown in FIG. 6. In an alternate embodiment, the available selections may be scrolled from top to bottom or vice versa, across the display screen 300. As a result, the user may scroll through all the items (for example, 352a, 352b, . . . , 352n), in one category (for example, the Movie/TV category 322a), and continue to scroll through all the items in the following or previous categories (for example, 322b), without having to change screens or to negotiate through a hierarchy of menus. The user may also use the skip buttons 274a and 274b (see FIG. 5) to skip from one category, e.g., category 322b, to another category 322c. To select the desired item, the user may depress the select button 273.

In one embodiment, the display screen 300 includes a writing stylus 360 that may be received within a slot 362 on a side of the display screen 300. The slot 362 includes two pairs of prongs 364a–b, 366a–b which retain the stylus 360 in the slot 362 during non-use. To prevent loss or misplacement of the stylus 362, the stylus 362 may be tethered to the display screen 300 by means of a cord 368. The stylus 360 may be used to enter textual information when the user is reviewing selections from a category such as the Shopping category 322d.

In an alternate embodiment, the display screen 300 (see display screen 400 of FIG. 7) or the control handset 250 (FIG. 5) may be configured to receive a credit card, so that payment for the purchase of an entertainment activity or shopping item may be made. For example, a card reader (e.g., a magnetic strip card reader) may be adapted along an edge of the control handset 250 parallel to the "hot" keys 278–279. An example of such a card reader is described in detail in U.S. patent application Ser. No. 08/639,287. Similarly, a card reader, e.g., slot 450 of FIG. 7, may be adapted along a side of the screen 400 for receiving a credit card. It is apparent to one of ordinary skill in the art that the slot 450 may be provided along any side or portion of the screen 400 as is aesthetically pleasing. In addition, the display screen 400 (FIG. 7) or the control handset 250 (FIG. 5) may be similarly configured to receive a smart card, so that secure transactions may be performed. In either case, information from the credit card or the smart card may be retrieved by the processor associated with the operation of the display screen 400 (such as processor 62 (FIG. 2C), processor 102 (FIG. 3) or a dedicated screen processor (not shown)). Such information includes personal information, e.g., name, address, telephone number, or financial information of the user.

Figure 7:
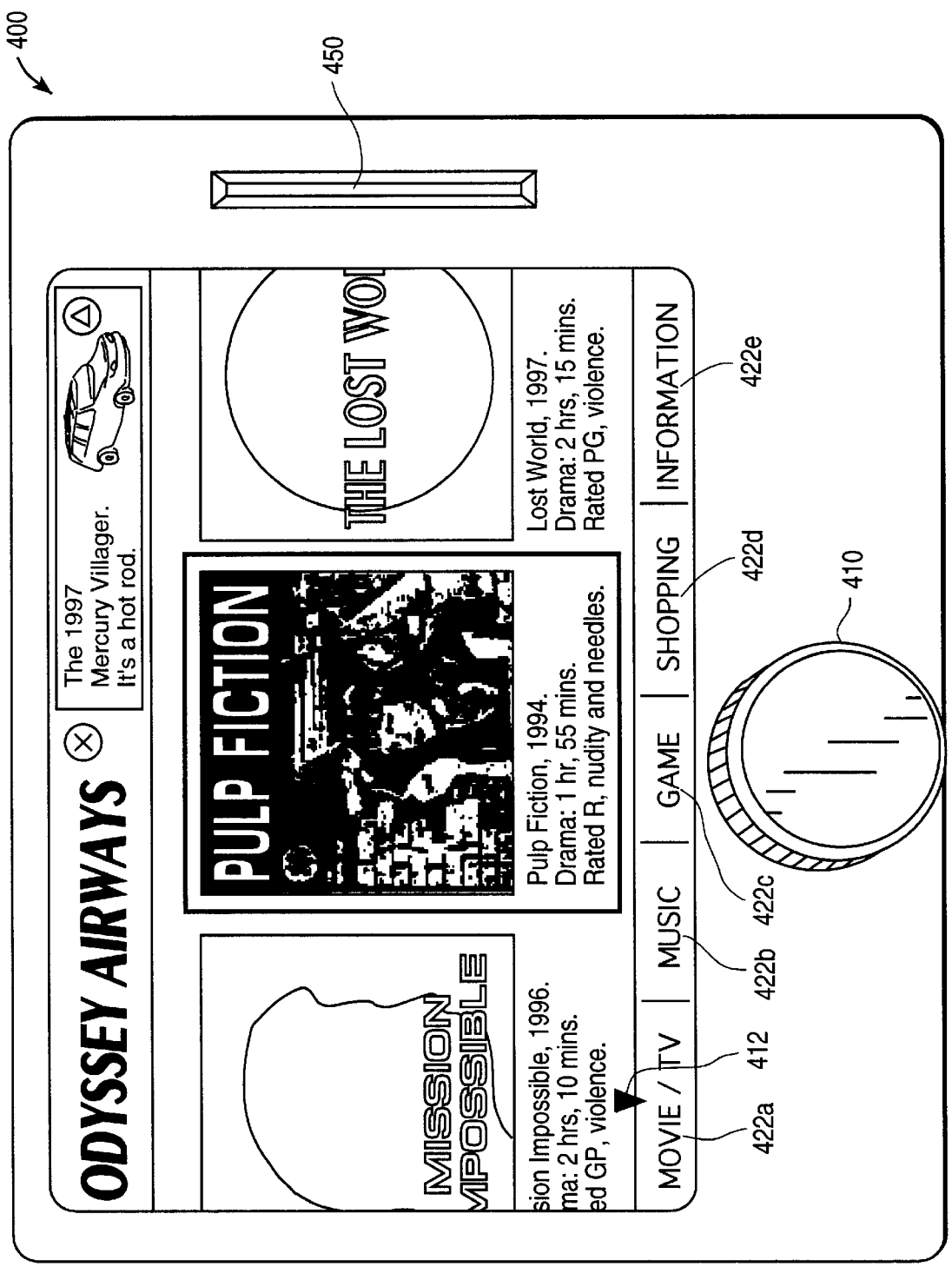
FIG. 7 illustrates an alternate embodiment of a display screen 400, which implements the scrolling navigational display system in accordance with the teachings of the present invention.

FIG. 7 illustrates an alternate embodiment of a display screen 400, which implements the scrolling navigational display system in accordance with the teachings of the present invention. The display screen 400 utilizes the scrolling navigational display page as described above. However, navigation through the available items or selections within each category may be performed through the use of a data wheel 410, that is mounted on the display screen 400. The data wheel 410 may be rotated in a clockwise or anti-clockwise direction. When the data wheel 410 is rotated in a clockwise manner, the indicator 412 will be moved through the items of one category, e.g., category 422a, and then through the items of the next category, e.g., category 422b. The marquee section 350 will simultaneously display the corresponding items of one category, e.g., category 422a, and continue to scroll through items in the next category, e.g., category 422b.

Conversely, when the data wheel 410 is rotated in an anti-clockwise direction, the indicator 412 will be moved through the items of one category, e.g., category 422b, and then through the items of a previous category, e.g., category 422a. Similarly, the marquee section 350 will simultaneously display the corresponding items of one category, e.g., category 422b, and continue to scroll through items in the previous category, e.g., category 422a. Selection of any item or category may be made by pushing the knob of the data wheel 410.

In one embodiment, the data wheel 410 is located at the bottom center portion of the display screen 400, as shown in FIG. 7. However, it is contemplated that the data wheel 410 may be located anywhere along the bottom portion of the display screen 400, for example, on the bottom left or the bottom right of the display screen 400. Similarly, the data wheel 410 may be located on any portion of the display screen 400, for example on the top right or the top left corner of the screen 400, as is aesthetically pleasing to the consumer.

In a further embodiment, a touch-sensitive screen as is known by one of ordinary skill in the industry, may be implemented, in which case, one of the available selections or categories may be chosen by touching the image of the selection or category displayed on the screen 400. In addition, the user may use the touch screen to skip from one category, e.g., category 422a, to another category, e.g., category 422b. Moreover, the user may use a stylus, such as the stylus 360 (FIG. 6) to touch the screen 400, in making his/her selection.

In yet a further embodiment, a card reader, e.g., slot 450 of FIG. 7, may be adapted along a side of the screen 400 for receiving a credit card or a smart card. It is apparent to one of ordinary skill in the art that the slot 450 may be provided along any side or portion of the screen 400, as is aesthetically pleasing.

In an alternate embodiment, the direction controller 272 as shown in FIG. 5, may be replaced by a data wheel, such as the data wheel 410 of FIG. 7. In this embodiment, the user may utilize the data wheel 410 as implemented on a handset 250 to navigate and/or scroll through a plurality of items and categories as displayed on the display screen 300 of FIG. 6. In addition, selection of any item or category may be made by pushing the knob of the data wheel 410.

In one further embodiment, the scrolling navigational display system of the present invention may be implemented within a processor system to which a display is coupled, as discussed earlier, and as shown in FIG. 2C. In this embodiment, selection of the categories and/or the available activities/information within a particular category, may be implemented through the use of a mouse or through the use of the arrow keys on a keyboard (or console) coupled to the processor system. Alternatively, a touch-sensitive screen, may be implemented, in which case, available selections may be chosen by touching the image of the selection displayed on the screen.

Moreover, in the embodiment in which a dedicated screen processor is used, a touch-sensitive screen may be implemented to facilitate selection of the desired item or items. The data wheel 410 (FIG. 7) may also be implemented in this embodiment to facilitate viewing of the available categories and items.

FIG. 8 illustrates a further alternate embodiment of a display screen 500, which implements the scrolling navigational display system in accordance with the teachings of the present invention. In this embodiment, a slider system 510 is used in place of the data wheel 410 of FIG. 7. In one embodiment, the slider system 510 is located below the category bar 520, and comprises a slider 512 that is received within an elongated slot 514. The user may slide the slider 512 along the slot, so as to scroll through the items and/or categories available. Selection of the items or categories may be made by depressing the slider 512, or, in the case where a touch-sensitive screen is implemented, by touching the screen. In the case where a stylus (such as stylus 360 of FIG. 6) is implemented, the stylus may be used to select an item or category, by touching the portion of the screen illustrating the item or category.

In yet a further embodiment, audio feedback may be incorporated via use of headphones connected through the head phone connector 262 (FIG. 4), so that the user can hear acknowledgment or confirmation of his selection. Alternatively, audio feedback may be provided by installing a speaker that is controlled by the dedicated screen processor, or by the processor 62 in the embodiment shown in FIG. 2C, or the processor 102 in the embodiment of FIG. 3.

Through the use of the present invention, a simple, user-friendly display system may be provided, in which a user with limited technical and/or linguistic abilities may be able to navigate and review available categories of entertainment activities and/or amenities on a display screen.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A display system comprising:
   a marquee area on a first portion of a display, said marquee area displaying one of a plurality of items as a current item;
   a category area on a second portion of the display, said category area displaying one of a plurality of categories as a current category, said current category being associated with the current item; and
   a scrolling mechanism for scrolling through the plurality of items ordered by the plurality of categories,
   wherein said marquee area is updated by the scrolling mechanism to display successive items from the plurality of items as the current item, and said category area is updated to display the one of the plurality of categories associated with the current item as the current category.

2. The system of claim 1, further comprising:
   a processor coupled to said display, and
   an interface through which said processor and the display communicate, said interface including a plurality of communication lines of which at least one communication line is used to transmit digital data.

3. The system according of claim 2, further comprising a control handset including the scrolling mechanism coupled to the processor through a second plurality of communication lines, wherein said control handset communicates with the processor by transmitting said digital data through said second plurality of communication lines to said processor.

4. The system of claim 1, wherein said scrolling mechanism comprises a direction controller having a plurality of indicia representative of a predetermined direction for scrolling through the plurality of categories and through a plurality of items within a currently displayed category.

5. The system of claim 4, wherein said scrolling mechanism further comprises a selection button for selecting an item or a category.

6. The system of claim 2, wherein the scrolling mechanism is a data wheel coupled to the processor through a second plurality of communication lines, wherein said data wheel communicates with the processor by transmitting said digital data through said second plurality of communication lines to said processor.

7. The system of claim 1, wherein said display further comprises a touch-sensitive screen and wherein entry of the current category or the current item is provided by pressing the category area or the marquee area.

8. The system of claim 1, further comprising a skipping mechanism that provides entry of one of the plurality of categories as the current category, said marquee area being updated by the skipping mechanism to display one of the plurality of items associated with the current category as the current item and updating said category area to display the current category.

9. The system of claim 1, further comprising a stylus coupled to said display, said stylus being used to enter information.

10. The system of claim 1, wherein the plurality of categories are user selectable entertainment options and said current item is one of a plurality of items within a selected entertainment option, said current item being selected by a user.

11. In an electronic unit, a user interface system comprising:
   a marquee area on a first portion of a display, said marquee area displaying one of a plurality of items as a current item;
   a category area on a second portion of the display, said category area displaying one of a plurality of categories as a current category, said current category being associated with the current item; and
   a scrolling mechanism for scrolling through the plurality of items ordered by the plurality of categories,
   wherein said marquee area is updated by the scrolling mechanism to display successive items from the plurality of items as the current item, and said category area is updated to display the one of the plurality of categories associated with the current item as the current category;

wherein the plurality of categories are user selectable entertainment options and said current item is one of a plurality of items within a selected entertainment option, said current item being selected by a user.

12. The system of claim 11, further comprising:

a processor coupled to said display, and an interface through which said processor and the display communicate, said interface including a plurality of communication lines of which at least one communication line is used to transmit digital data.

13. The system according of claim 12, further comprising a control handset including the scrolling mechanism coupled to the processor through a second plurality of communication lines, wherein said control handset communicates with the processor by transmitting said digital data through said second plurality of communication lines to said processor.

14. The system of claim 13, wherein said scrolling mechanism comprises a direction controller having a plurality of indicia representative of a predetermined direction for scrolling through the plurality of categories and through a plurality of items within a currently displayed category.

15. The system of claim 14, wherein said scrolling mechanism further comprises a selection button for selecting an item or a category.

16. The system of claim 12, wherein the scrolling mechanism is a data wheel coupled to the processor through a second plurality of communication lines, wherein said data wheel communicates with the processor by transmitting said digital data through said second plurality of communication lines to said processor.

17. The system of claim 11, wherein said display further comprises a touch-sensitive screen and wherein entry of the current category or the current item is provided by pressing the category area or the marquee area.

18. The system of claim 11, further comprising a skipping mechanism that provides entry of one of the plurality of categories as the current category, said marquee area being updated by the skipping mechanism to display one of the plurality of items associated with the current category as the current item and updating said category area to display the current category.

19. The system of claim 1, further comprising a stylus coupled to said display, said stylus being used to enter information.

20. A method for displaying items comprising:

providing a display having a marquee area on a first portion of a display, said marquee area displaying one of a plurality of items as a current item, said display also having a category area on a second portion of the display, said category area displaying one of a plurality of categories as a current category, said current category being associated with the current item;

scrolling through the plurality of items ordered by the plurality of categories;

updating the marquee area to display successive items from the plurality of items as the current item;

updating the category area to display the one of the plurality of categories associated with the current item as the current category.

21. The method of claim 20, further comprising activating a selector to select the current item.

22. A computer program embodied in data signals, said computer program for displaying a plurality of items where each item is associated with one of a plurality of categories, said computer program comprising:

a first segment for displaying a current item from the plurality of items in a first display area;

a second segment for displaying a category associated with the current item in a second display area;

a third segment for providing an indicator that indicates the category associated with the current item;

a fourth segment for receiving a control signal to cause successive items to be displayed sequentially in the first display area as the current item, said successive items ordered by the associated categories.

23. The computer program of claim 22 wherein the control signal includes a forward direction and a reverse direction and the items are sequentially displayed in a forward order when the forward direction is received, and the items are sequentially displayed in a reverse order when the reverse direction is received.

24. The computer program of claim 22 the first segment further comprises displaying a preceding item and a succeeding item in the first display area, and the second segment further comprises displaying a preceding category and a succeeding category the second display area, wherein the categories are displayed with an orientation and order parallel to the items.

25. The computer program of claim 24 wherein the third segment further comprises providing the indicator generally adjacent to the category associated with the current item at a position that is suggestive of the relative location of the current item within the category associated with the current item.

26. The computer program of claim 22 further comprising a fifth segment for receiving a select signal to cause the current item to be selected.

* * * * *

UNITED STATES PATENT AND TRADEMARK OFFICE
CERTIFICATE OF CORRECTION

PATENT NO.    :  6,034,688
DATED         :  March 7, 2000
INVENTOR(S)   :  Greenwood et al.

It is certified that error appears in the above-identified patent and that said Letters Patent is hereby corrected as shown below:

In column 7 at line 4 delete "stroll" and insert --scroll--

Signed and Sealed this

Twenty-seventh Day of March, 2001

Attest:

NICHOLAS P. GODICI

Attesting Officer

Acting Director of the United States Patent and Trademark Office